United States Patent
Lehmensieck et al.

(10) Patent No.: US 11,137,011 B2
(45) Date of Patent: Oct. 5, 2021

(54) FASTENING SYSTEM FOR FASTENING A FIRST COMPONENT AT A VARIABLE SPACING ON A SECOND COMPONENT

(71) Applicant: Airbus Operations GmbH, Hamburg (DE)

(72) Inventors: Niklas Lehmensieck, Hamburg (DE); Hermann Benthien, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 376 days.

(21) Appl. No.: 16/218,593

(22) Filed: Dec. 13, 2018

(65) Prior Publication Data

US 2019/0195261 A1  Jun. 27, 2019

(30) Foreign Application Priority Data

Dec. 22, 2017 (DE) .......................... 102017131132.7

(51) Int. Cl.
*F16B 21/02* (2006.01)
*F16B 5/02* (2006.01)
(Continued)

(52) U.S. Cl.
CPC .............. *F16B 21/02* (2013.01); *F16B 5/025* (2013.01); *F16B 21/073* (2013.01); *F16B 37/085* (2013.01)

(58) Field of Classification Search
CPC ........ F16B 21/02; F16B 21/073; F16B 5/025; F16B 5/0233; F16B 5/0614; F16B 5/0628;
(Continued)

(56) References Cited

U.S. PATENT DOCUMENTS 2,434,876 A * 1/1948 Warren James W ..... F16B 5/10
411/554
3,076,629 A 2/1963 Henry-Biabaud
(Continued)

FOREIGN PATENT DOCUMENTS

DE 1430281 A 5/1969
DE 60029409 T2 12/2006
(Continued)

OTHER PUBLICATIONS

German Search Report; priority document.

*Primary Examiner* — Victor D Batson
*Assistant Examiner* — Amit Singh Dhillon
(74) *Attorney, Agent, or Firm* — Greer, Burns & Crain, Ltd.

(57) ABSTRACT

A fastening system for fastening a first component variably spaced on a second component has a main body, a slide, and an elongate locking element. The main body has a mounting surface for mounting on the first component and a locating surface, through which an elongate depression passes, for fastening to the second component. The main body has a slideway to movably support the slide along the depression and the locating surface. Facing sides of the slide and the depression each have a first tooth system. The locking element fits into the elongate depression and has a second tooth system on two mutually opposite longitudinal sides and engages between the depression first tooth system and the locking element and between the slide and the locking element in a first alignment within the depression and releases it in a second alignment. The mounting surface and locating surfaces are not parallel.

11 Claims, 3 Drawing Sheets

(51) Int. Cl.
*F16B 37/08* (2006.01)
*F16B 21/07* (2006.01)

(58) Field of Classification Search
CPC .............. F16B 37/085; B64D 11/0696; B64D 11/06395; B64D 11/064; A47C 1/0242; Y10T 403/1616; Y10T 403/1624
See application file for complete search history.

(56) References Cited

U.S. PATENT DOCUMENTS

| | | | |
|---|---|---|---|
| 6,499,712 B1 * | 12/2002 | Clark | ................... B60N 2/0232 |
| | | | 248/424 |
| 9,789,965 B2 | 10/2017 | Benthien et al. | |
| 2005/0133666 A1 * | 6/2005 | Zerner | ............... B64D 11/0696 |
| | | | 244/118.6 |

FOREIGN PATENT DOCUMENTS

| | | | |
|---|---|---|---|
| DE | 102010053892 A1 | 6/2012 | |
| DE | 102012110986 A1 * | 5/2013 | ............ F16B 37/085 |
| DE | 102013105095 A1 | 8/2014 | |

* cited by examiner

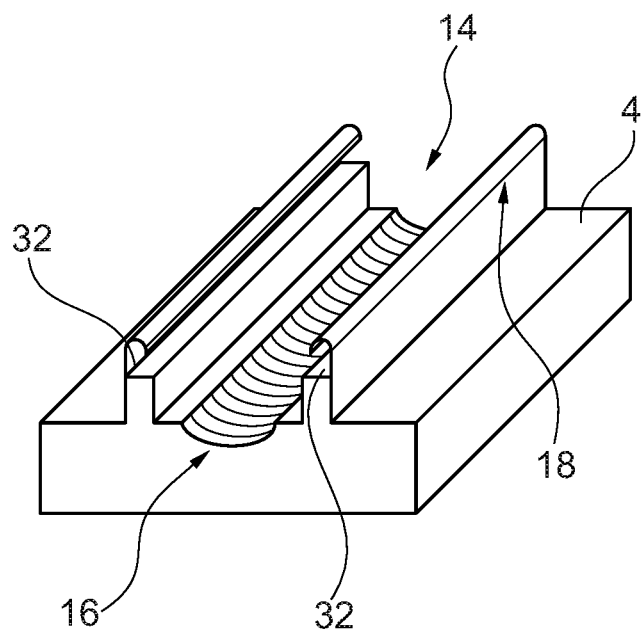
Fig. 3a
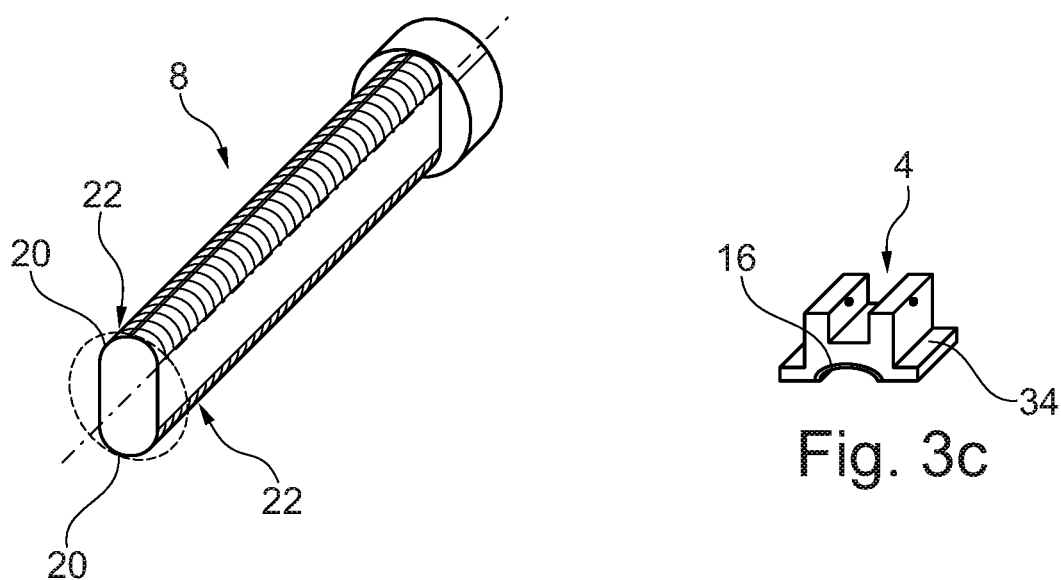
Fig. 3b
Fig. 3c

FASTENING SYSTEM FOR FASTENING A FIRST COMPONENT AT A VARIABLE SPACING ON A SECOND COMPONENT

CROSS-REFERENCES TO RELATED APPLICATIONS

This application claims the benefit of the German patent application No. 10 2017 131 132.7 filed on Dec. 22, 2017, the entire disclosures of which are incorporated herein by way of reference.

FIELD OF THE INVENTION

The invention relates to a fastening system for fastening a first component at a variable spacing on a second component, and to an aircraft, having a fuselage with a fuselage structure and at least one component which is fastened on the fuselage structure by means of a fastening system of this kind.

BACKGROUND OF THE INVENTION

In an aircraft which has a fuselage, there is usually a passenger cabin with a multiplicity of equipment items. For this purpose, the fuselage, which is built up by means of the fuselage structure, is provided on the inside with a multiplicity of holders, which are matched individually to the items of equipment to be held and ensure the secure mounting of the items of equipment at a predetermined location. In the case of aircraft and especially relatively large passenger aircraft with fuselage lengths of well over 10 m, certain manufacturing tolerances must always be expected, and these must be taken into account in the arrangement of holders. While equipment items in the fuselage should comply with a clearly predetermined geometry, the individual holders must be adapted to compensate for the production tolerances of the fuselage structure. For example, any undulation in a line or surface formed by several overhead storage bins should be restricted to a significantly greater extent than, for example, dimensional tolerances of the fuselage structure.

The compensation of tolerances for adaptation of the visible contours in the interior of a cabin of an aircraft is laborious. In particular, adjustment can involve opening and closing screwed joints consisting, for example, of nuts and lock nuts on screw elements. Moreover, customization or retrofitting of items of equipment is difficult owing to the required holders on the fuselage structure since additional holding devices must be mounted on structural components or existing holding devices must be removed and reattached at some other location.

SUMMARY OF THE INVENTION

Consequently, there could be a requirement for a fastening system which has the possibility of particularly fine compensation of tolerances without making the accuracy of the components that are necessary for this purpose excessive. Consequently, it is an object of the invention to propose a fastening system having a tolerance compensating capability in which tolerances can be compensated even at a very small scale and the components required are not particularly fine.

A fastening system for fastening a first component at a variable spacing on a second component is proposed. The fastening system has a main body, a slide, and an elongate locking element. The main body has a mounting surface for mounting on the first component and a locating surface, through which an elongate depression recessed into the main body passes, for fastening to the second component. The main body has a slideway for the movable support of the slide along the depression and the locating surface. That side of the slide which faces the depression and that side of the depression which lies opposite the slide each have a first tooth system. The locking element can be introduced into the elongate depression and has a second tooth system on two mutually opposite longitudinal sides and is designed to establish engagement between the first tooth system of the depression and of the locking element and between the slide and the locking element in a first alignment within the depression and to release it in a second alignment. The mounting surface and the locating surface are not parallel to one another.

The fastening system according to the invention thus has three main components, which, in cooperation, provide a type of adapter, a flange, a fastening means or the like, which are situated between two components to be fastened to one another. The slideway alone enables the slide to be moved in an infinitely variable manner along the elongate depression. By locking the position of the slide on the main body by means of the locking element, the position of the slide can be fixed, allowing for the toothing details. By virtue of the nonparallel configuration of the mounting surface and of the locating surface, however, the movement of the slide can be regarded as being on an oblique plane or ramp. This has the effect that, when the slide is attached to a second component and the mounting surface of the main body is connected to the first component and the slide is moved along the slideway, a movement that is vertical thereto is also performed between the two components. The extent of this additional vertical movement depends substantially exclusively on the angle between the mounting surface and the locating surface.

Consequently, a fine vertical movement can be achieved by a relatively coarse linear movement of a slide along the slideway. By locking a position, once reached, a permanent spacing between the two components to be fastened can be set very finely.

The main body forms a base of the fastening system and can be screwed directly to the first component by means of its mounting surface or can be connected thereto in some other way. However, it is also possible to integrate the main body directly into the first component, thus eliminating the need for additional screw fastening. The function of the main body is limited essentially to the provision of the spatially fixed elongate depression with a certain gradient. The depression extends from the first tooth system as far as a slot or a similarly designed recess in the locating surface and is arranged within the main body or a component forming the latter.

The locking body is designed to correspond to the elongate depression. At the same time, it should be ensured that the locking body can be introduced into the elongate depression through an open front face, via an openable slot facing the locating surface or in some other way, for example. In particular, the locking body can be based on a cylindrical body which has two mutually opposite flanks that are narrower than the remaining part of the locking body. These flanks can be arranged parallel to one another and can each extend along the longitudinal axis.

The flanks are preferably configured in such a way that the second tooth system is located exclusively on circumferential regions of the locking element which are adjacent to the flanks and extend along the longitudinal axis of the element.

The untoothed flanks can be formed by material removal, e.g., by milling, from a previously cylindrical workpiece. The toothed circumferential regions can each include an angular range of 90° or somewhat less, thus allowing precise unlocking, during which the second tooth system is released from engagement with the first tooth system. In this embodiment, rotation of the locking element through substantially 90° can lead to locking or unlocking.

The aim of the locking element is to permit rotation about its longitudinal axis within the main body and, during this process, to implement or release engagement of the first tooth system and the second tooth system when required. By means of a rotation, a first alignment of the locking element in the main body or a second alignment thereof offset by 90° from the first alignment, for example, can be achieved. By virtue of the partial toothing of the locking element, engagement between the second tooth system and the first tooth system is established only in one of these two alignments, that is to say only in one of these two alignments do the tooth systems engage in one another.

The main body has the ability to guide the slide by means of the slideway. The slide likewise has a first tooth system, which is directed towards the first tooth system of the elongate depression in an inserted state of the slide. Consequently, if the locking body is situated in the main body and the slide has been inserted into the slideway, a movement of the slide can easily be permitted by rotating the locking body or completely prevented by engagement of the tooth systems.

To set a desired spacing between the first component and the second component, the locking element can thus be released from engagement with the first tooth system, ensuring that the slide is free and can be moved substantially without resistance in the slideway. If there is a tolerance to be compensated during the mounting of the first component on the second component, for instance, the desired position of the two components relative to one another can be set by means of an assembly stand, a guide or some other holding device. If the fastening system explained above is situated between both components, a necessary position of the slide on the main body can thus be obtained as the two components are aligned relative to one another. This position can then be fixed by rotating the locking element, after which the assembly stand or guide is removed again. The two components remain in this position, at least at the location at which the fastening system is integrated.

At this point, it may be mentioned that, owing to the fact that the slide can be moved over more or less large distances, there must be a certain tolerance between the two components to be fastened to one another to allow this movement. It is therefore conceivable for a type of holding strut, rocker pendulum or the like additionally to be arranged on the slide, and for it then to be connected to a component fixed with respect to the structure, or the second component, for example. This design can readily compensate for the linear movement of the slide.

However, the main body can also be of multi-part construction. It is not absolutely necessary to configure the main body with a particular predetermined angle between the mounting surface and the locating surface. On the contrary, it may also be expedient to provide a wedge-shaped adapter that supplies the mounting surface. This can be arranged on an interface of the main body and can have a particular angle between this interface and the mounting surface formed by the adapter.

In a particularly advantageous embodiment of the invention, the angle between the mounting surface and the locating surface is less than 45°. To achieve a desired finer vertical movement on the basis of a linear movement in a transverse direction, an angle of less than 45° is required. Only then does the adjustment resolution of the transverse movement, which is dependent on the adjustment resolution of the linear movement, become finer. To make the adjustment resolution significantly finer, however, an angle significantly below 45° should be set. At 45°, the adjustment path of the slide along the depression would correspond to the vertical adjustment between the two components, at least over large sections.

In a preferred embodiment, the angle between the mounting surface and the locating surface is no more than 25° and, particularly preferably, no more than 10°. It is thereby already possible to achieve a ratio of somewhat over 2 to more than 5, and therefore a refinement by 2 to 5 times and beyond is already easily achieved. At an angle of 25°, a linear movement of approximately 2.1 cm is required to achieve a transverse movement of approximately 1 cm. At an angle of 10°, however, a linear movement of approximately 5.7 cm is already required.

It is particularly advantageous if the slideway is formed by mutually opposite recesses along the depression, in which mutually opposite lateral edges of the slide are guided. By means of these recesses, slides can be protected from falling out or from accidental release. The recesses can either be produced integrally or can be implemented by separately manufactured strip-shaped cover elements which close the depression along the locating surface and form a slot or a gap with one another. It would then be possible occasionally to remove the cover elements from the main body, to insert the locking element into the elongate depression, to insert the slide and then to screw the cover elements to the main body. However, other, completely different options are also conceivable.

In another advantageous embodiment, the locking element has, on one end face, an engagement element, which can be accessed at one end face of the elongate depression. The engagement element is used to connect a tool to the locking element in order to initiate rotation of the locking element. The engagement element can be situated outside the elongate depression or within the latter if there is an opening at one end face of the depression for pushing through the corresponding tool.

At this point, it may be stated that the "end face" or the term "at the end face" refers to a point which is at one end of an element along the longitudinal axis thereof. If the depression extends along a longitudinal axis, an end face is at the end of the depression along the longitudinal axis. The same applies analogously also to the locking element, the end faces of which are situated at the ends along the longitudinal axis.

The slide can furthermore have a flange, which extends through a cutout in the elongate depression or out of the slideway in a direction away from the main body for coupling to the second component. By means of this flange, a fork or some other connecting element, for example, can be mounted in an articulated manner in order to mount a holding strut, a rocker pendulum or the like.

The mounting surface can furthermore be fitted with a plurality of connecting elements, which allow connection of the main body to the first component. In a simple case, these are screws, bolts or other suitable elements. As explained above, the main body can also already be implemented as an integral part in the first component, however.

The invention furthermore relates to a vehicle having a fuselage structure and a plurality of first components installed on the fuselage structure, wherein a holding strut, which is connected to the first components by means of the fastening system explained above, is arranged as a second component between the first components and the fuselage structure. Particularly when equipping relatively large vehicles and especially passenger aircraft, the tolerances of a fuselage structure can differ from the required tolerances of interior equipment components. In order to compensate for these, at least in a certain range, the components can be attached to the fuselage structure with the aid of the fastening system mentioned.

In a particularly preferred embodiment, the vehicle is an aircraft.

BRIEF DESCRIPTION OF THE DRAWINGS

Further features, advantages and possible uses of the present invention will be found in the following description of the embodiment examples and the figures. Here, all the features described and/or depicted, in themselves and in any desired combination, form the subject matter of the invention, even when considered independently of their combination in the individual claims or the dependency references thereof. In the figures, the same reference signs furthermore stand for identical or similar objects.

FIGS. 3a to 3c show individual parts of the fastening system in three-dimensional views.

DETAILED DESCRIPTION OF THE PREFERRED EMBODIMENTS

Figure 1:
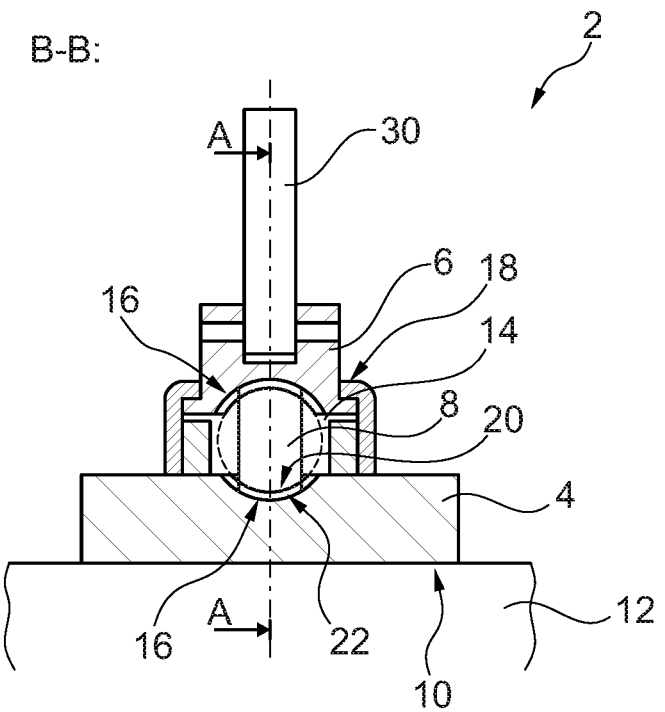
FIGS. 1 and 2 show the fastening system in two different views.

FIG. 1 shows a sectioned end view of a fastening system 2 according to the invention. The fastening system 2 has a main body 4, a slide 6, and an elongate locking element 8. The main body 4 has a mounting surface 10, by means of which the main body 4 can be fastened on a first component 12 to be fastened. The first component 12 is indicated only schematically but in fact it can have a significantly greater extent.

The main body 4 has an elongate depression 14, which extends in a direction perpendicular to the plane of the drawing. The depression 14 has a first tooth system 16 on a side facing the first component 12 or mounting surface 10. This tooth system extends over a circumferential segment, situated in the plane of the drawing, of the depression of no more than 90°.

The slide 6 is arranged on a side facing away from the mounting surface 10 and is supported movably in a slideway 18 of the main body 4. The slide 6 likewise has a first tooth system 16 on its side facing the main body 4. The locking element 8, for its part, has two mutually opposite regions 20 with a second tooth system 22, which are shaped to correspond to the first tooth system 16.

As can be seen in the drawing, the regions 20 are likewise restricted substantially to circumferential segments of 90° in each case, which are here situated in the plane of the drawing, and therefore tooth engagement between the locking element 8 and the slide 6 or main body 4 can be established only in the position illustrated here.

Figure 2:
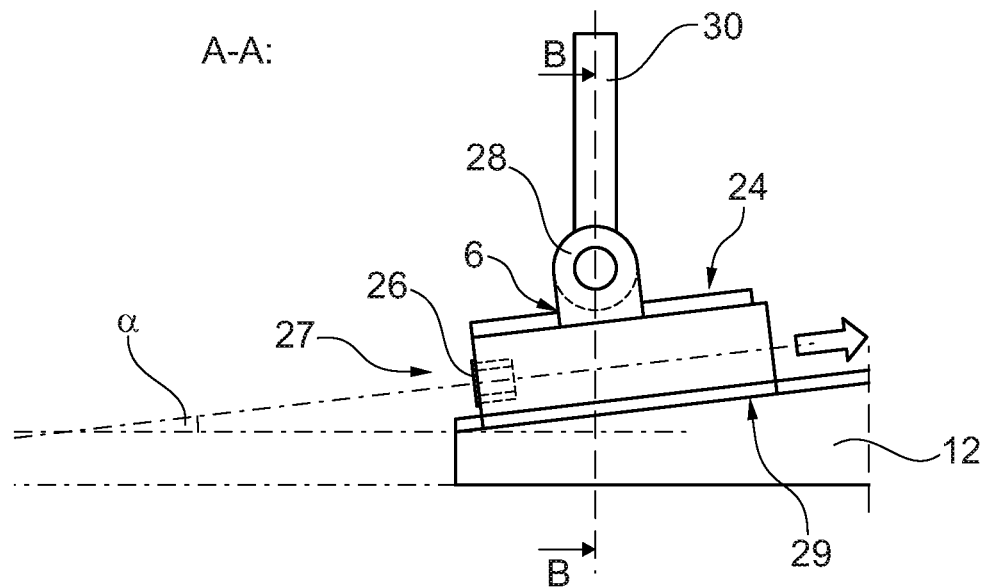

FIG. 2 indicates that the slide 6 can be moved on an oblique plane. Here, the locating surface 24 is angled at an angle of $\alpha=7.5°$. As a result, a linear movement of the slide 6 is about 7.6 times greater than the transverse movement.

An engagement element 26, by means of which the locking element 8 can be rotated in order to carry out locking or unlocking, is furthermore illustrated on one end face 27.

At this point, it may be noted that, by way of example, part of the first component 12 forms part of the fastening system 2. Here, a ramp-shaped surface 29, which lies substantially parallel to the locating surface 24, is provided. Consequently, the underside of the main body 4 is a kind of interface 29, which is complemented by the beveled shape of the first component 12.

To attach the slide 6, a kind of flange 28, which can be connected in an articulated manner to a holding strut 30, is arranged on the slide. When the slide 6 moves along the locating surface 24, the spacing with respect to the mounting surface 10 decreases or increases. Depending on the angle $\alpha$, a greater or lesser movement along the locating surface 24 is necessary for this purpose. In the case of a conventional tooth system which is not too fine, a very fine adjustment range can thus be set in the vertical direction if the angle is appropriately chosen.

In FIGS. 3a to 3c, the core components are shown once again in detail in three-dimensional illustrations. FIG. 3a shows the main body 4, which precisely shows the elongate depression 14 with the first tooth system 16 situated therein. Also shown here is a recess 32 on each side of the locating surface 24, into which the slide 6 can be introduced. It is clear here that there is no resistance to the slide 6 when the locking element 8 is not arranged in the depression 14.

The locking element 8 is illustrated in greater detail in FIG. 3b. Here, it can be seen that the profile of the locking element 8 is based substantially on a circular cross section, on which two regions 20 arranged opposite one another and having a second tooth system 22 are arranged. If the locking element 8 is placed in the elongate depression 14 and if it has the orientation shown in FIG. 3b, the second tooth system 22 and the first tooth system 16 enter into engagement. The locking element 8 can thus no longer be moved, and the sliding element 6 likewise enters into engagement with the second tooth system 22.

This is furthermore illustrated in FIG. 3c. Here, lateral tabs 34 are shown, these being configured, by way of example, to be moved in the lateral recesses 32 of the main body 4.

Of course, other embodiments can also be implemented, and all the illustrations in the figures are shown merely in a schematic way in order to illustrate the core concept of the invention.

Figure 4:
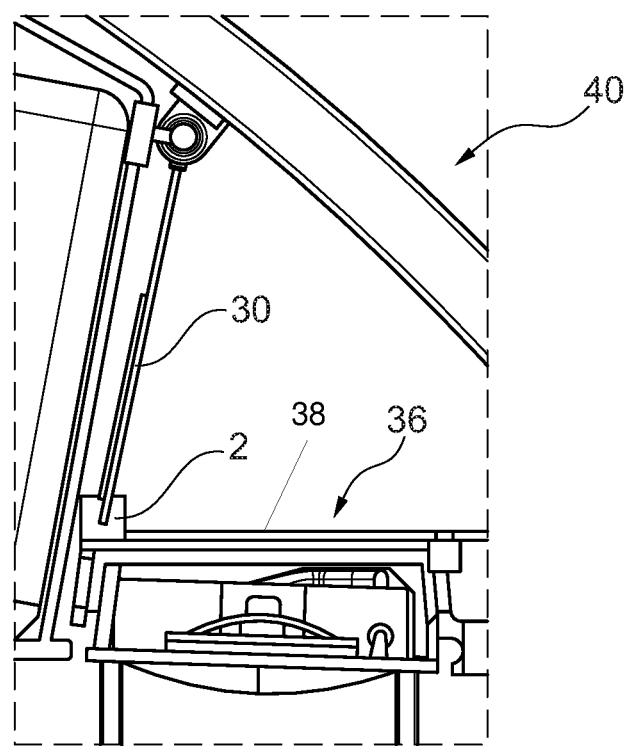
FIG. 4 shows the fastening of a first component on a fuselage structure of a vehicle.

In FIG. 4, fastening of a module 36 as a first component 38 on a fuselage structure 40 of an aircraft, in which a holding strut 30 is connected to a fastening system 2, is illustrated by way of example, wherein the fastening system is arranged on the first component 38 itself. As a result, it is possible, in particular, for very fine adjustments of the spacing of one side of the first component 38 from the fuselage structure 40 to be performed.

Figure 5:
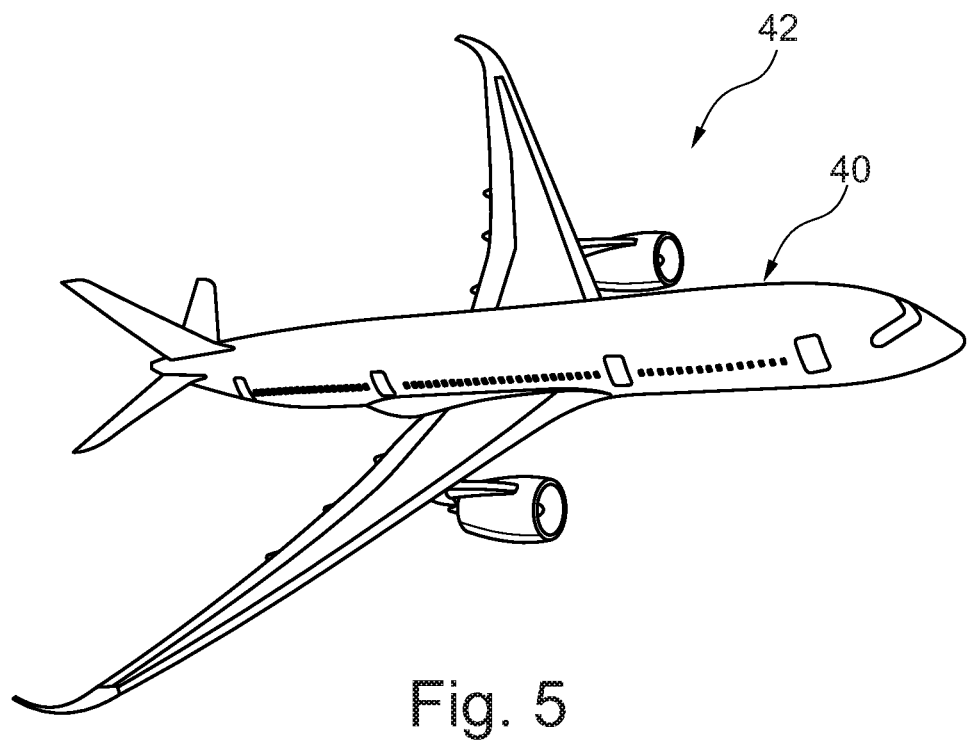
FIG. 5 shows an aircraft with a fuselage structure and components installed therein.

Finally, FIG. 5 shows an aircraft 42, in which a passenger cabin having a plurality of such components is arranged, the tolerance of each of the components being adapted to the fuselage structure 40 by means of at least one fastening system of this kind.

For the sake of completeness, it should be noted that "having" does not exclude any other elements or steps and "a" or "an" does not exclude a multiplicity. It should furthermore be noted that features which have been described with reference to one of the above embodiment examples can also be used in combination with other features of other embodiment examples described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fastening system for fastening a first component at a variable spacing on a second component, having:
   a main body,
   a slide, and
   an elongate locking element,
   wherein the main body has a mounting surface for mounting on the first component and a locating surface, through which an elongate depression recessed into the main body passes, for fastening to the second component,
   wherein the main body has a slideway to movably support the slide along the elongate depression and the locating surface,
   wherein that side of the slide which faces the elongate depression and that side of the elongate depression which lies opposite the slide each have a first tooth system,
   wherein the locking element can be introduced into the elongate depression and has a second tooth system on two mutually opposite longitudinal sides and is configured to establish engagement between the first tooth system of the elongate depression and of the locking element and between the slide and the locking element in a first alignment within the elongate depression and to release engagement in a second alignment, and
   wherein the mounting surface and the locating surface are not parallel to one another.

2. The fastening system as claimed in claim 1, wherein the main body is of multi-part design and has a wedge-shaped adapter which can be mounted on an interface of the main body and forms the mounting surface, which is not parallel thereto.

3. The fastening system as claimed in claim 1, wherein an angle between the mounting surface and the locating surface is less than 45°.

4. The fastening system as claimed in claim 1, wherein an angle between the mounting surface and the locating surface is no more than 25°.

5. The fastening system as claimed in claim 4, wherein the angle between the mounting surface and the locating surface is no more than 10°.

6. The fastening system as claimed in claim 1, wherein the slideway is formed by mutually opposite recesses along the elongate depression, in which mutually opposite lateral edges of the slide are guided.

7. The fastening system as claimed in claim 1, wherein the locking element has, on one end face, an engagement element, which can be accessed at one end face of the elongate depression.

8. The fastening system as claimed in claim 1, furthermore having a flange, which extends through a cutout in the elongate depression or out of the slideway in a direction away from the main body for coupling to the second component.

9. The fastening system as claimed in claim 1, wherein the mounting surface is fitted with a plurality of connecting elements, which allow connection of the main body to the first component.

10. A vehicle comprising:
    a fuselage structure, and
    a plurality of first components installed on the fuselage structure,
    wherein a holding strut is connected to the first components by means of a fastening system for fastening a first component at a variable spacing on a second component, having:
      a main body,
      a slide, and
      an elongate locking element,
      wherein the main body has a mounting surface for mounting on the first component and a locating surface, through which an elongate depression recessed into the main body passes, for fastening to the second component,
      wherein the main body has a slideway to movably support the slide along the elongate depression and the locating surface,
      wherein that side of the slide which faces the elongate depression and that side of the elongate depression which lies opposite the slide each have a first tooth system,
      wherein the locking element can be introduced into the elongate depression and has a second tooth system on two mutually opposite longitudinal sides and is configured to establish engagement between the first tooth system of the elongate depression and of the locking element and between the slide and the locking element in a first alignment within the elongate depression and to release engagement in a second alignment, and
      wherein the mounting surface and the locating surface are not parallel to one another, and
    wherein the holding strut is arranged between the first components and the fuselage structure.

11. The vehicle as claimed in claim 10, wherein the vehicle is an aircraft.

* * * * *